Feb. 4, 1969 D. J. THOR, JR 3,426,283
QUADRATURE SIGNAL SUPPRESSION CIRCUIT
Filed Sept. 10, 1965
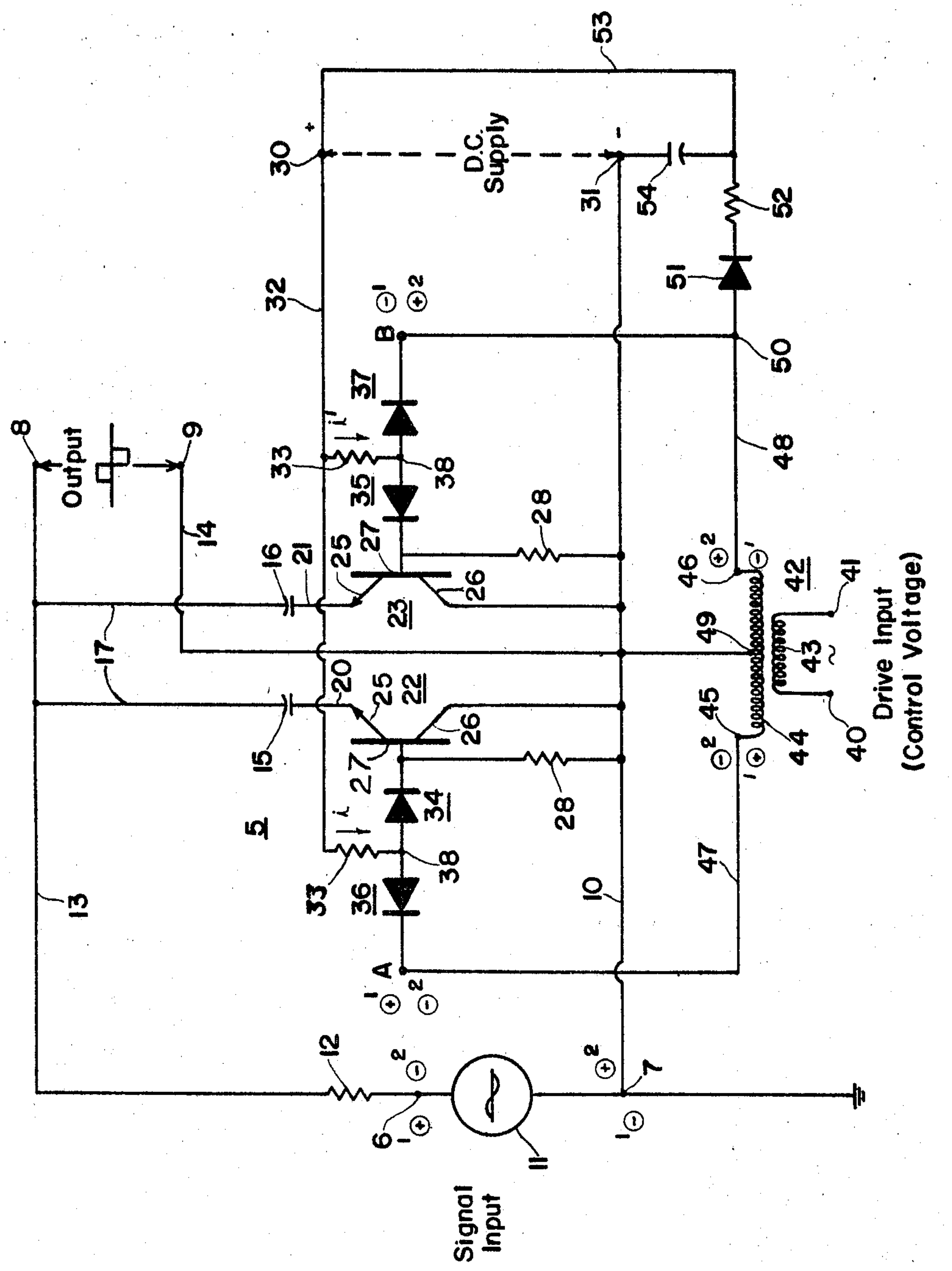
INVENTOR.
DEXTER J. THOR, JR.
BY Harry M. Saragovitz, Edward J. Kelly, Herbert Berl & S. Dubroff
ATTORNEYS United States Patent Office 3,426,283
Patented Feb. 4, 1969

3,426,283
QUADRATURE SIGNAL SUPPRESSION CIRCUIT

Dexter J. Thor, Jr., Troy, Mich., assignor, by mesne assignments, to the United States of America as represented by the Secretary of the Army Filed Sept. 10, 1965, Ser. No. 486,576
U.S. Cl. 328—166 3 Claims
Int. Cl. H03b *1/04;* H04b *15/00, 1/10*

ABSTRACT OF THE DISCLOSURE

A pair of filter capacitors are connected alternately in shunt relation across a signal translating circuit each through the emitter-collector path of a transistor switching device under control of an applied alternating-current voltage which is coupled to each transistor base element for out of phase operation therewith. A bias current control circuit for each transistor device includes a bias resistor connected with each base to the low side of the translating circuit and the transistor collector elements, two pairs of series-connected diodes in back-to-back relation through which the alternating current control voltage is applied to the transistor base elements, and a bias current supply connection to the junction between each diode pair through a current controlling resistor from the alternating-current control voltage source.

The present invention relates to signal translating circuits of the filter type for removing certain undesirable components in signals transmitted therethrough. More particularly, the present invention relates to filter circuits of the suppression type for certain signal components which are ninety degrees out of phase with the translated signal or driving source. Suppression type filter circuits require active rather than passive control elements therein, and, while more effective, are substantially more complicated generally.

It is an object of this invention to provide an improved and simplified signal translating circuit for suppressing ninety degree out-of-phase signal components in signals translated therethrough.

It is a further object of this invention to provide an improved and simplified signal-translating circuit of the filter type for suppressing signal components that are ninety degrees out of phase with the driving source or desired carrier information.

It is also an object of this invention to provide an improved and simplified carrier signal filter circuit of the quadrature suppression type for square-wave signal output at the average amplitude levels of the desired carrier information.

In accordance with the invention, a signal translating circuit of the filter type, for suppressing ninety degree out-of-phase signal components in carrier-wave signals and the like, is provided with a pair of filter or control capacitors connected alternately in shunt relation across the translating circuit in connection with the signal output end thereof. The signal suppression is implemented by two active control or gating devices for the capacitors, alternately responsive to a rectified alternating-current control voltage applied thereto.

The desired input signal or carrier information and the driving signal or control voltage are of the same frequency and may be of like or unlike polarity depending upon whether they are in phase or 180° out of phase. On each half cycle of the driving signal or control voltage the capacitors are alternately charged and tend to charge to the DC average component of the translated signal or carrier half wave. On each half cycle as the polarities of the carrier or input signal and the driving signal of control voltage reverse, the modes of the control devices likewise are reversed, producing a signal condition on one capacitor equal to the other capacitor but of opposite polarity. The result is a square wave approximately equal to the average value of the carrier. Quadrature signals have an average DC component equal to zero over any given half cycle and are consequently suppressed.

The invention will further be understood from the following description when considered in connection with the accompanying drawing showing an embodiment thereof, and its scope is pointed out in the appended claims.

In the drawing, the single figure is a schematic circuit diagram of a signal translating circuit, providing a filter of the active suppression type, in accordtnce with the invention, for signal components that are 90° out of phase with the control voltage.

Referring to the drawing, a signal translating circuit 5 of the filter type referred to is provided with signal input terminals 6 and 7 for connection with a signal source such as a carrier wave signal source 11, and signal output terminals 8 and 9. The filter circuit is of the active suppression type provided with a common return circuit or low-side ground conductor 10 connected with the terminal 7 at the input end and with the output terminal 9 through an extension conductor 14. The opposite input terminal 6 is connected with the remaining or high side of the output circuit at the terminal 8 through a current-limiting series impedance element, such as a resistor 12, and a connection lead or conductor 13 at the high side of the circuit as indicated.

Connected with the high and output side 13 of the filter circuit and effectively at the output terminal 8, are connected two storage or filter capacitors 15 and 16 through connection leads 17 as indicated. The storage or filter capacitors 15 and 16 are connected in shunt relation with or across the translating or filter circuit between the high potential lead 13 and ground 10 through connection leads 20 and 21 and series gating devices indicated in the present example by a pair of transistors 22 and 23 respectively. These may be of the NPN type, as indicated, having emitter electrodes 25 connected each with one of the capacitors and collector electrodes 26 connected to ground. The transistor bases 27 are connected to the diode network and to ground through resistors 28.

The transistor bases 27 are quiescently energized or maintained at a positive potential by currents *i* and *i* prime generated by a DC supply source having positive and negative supply terminals 30 and 31 respectively, the negative terminal being connected to the ground lead or chassis 10. The positive terminal 30 is connected to the bases 27 through a common supply lead 32 and individual series supply resistors 33 followed by series diodes 34 and 35 polarized for conduction in the forward direction to apply the positive operating current to the bases.

Connected directly with the diodes 34 and 35 in back-to-back or opposite polarity relation thereto, are a pair of diodes 36 and 37, respectively, having a common terminal 38 therebetween with the supply resistors 33. These diodes are connected respectively with a pair of driver signal or control voltage terminals A and B as indicated.

A source of control voltage is provided externally of the circuit and may of any suitable type. This is connected with drive input terminals indicated at 40 and 41. A transformer 42 couples the control voltage to the terminals A and B providing circuit isolation when necessary and push-pull drive to terminals A and B. This transformer has a primary winding 43, when isolation is required, connected to terminals 40 and 41, and a secondary winding 44 having terminals 45 and 46 connected respectively with the terminals A and B through supply leads 47 and 48, as indicated. The secondary 44 is provided with a center tap 49 connected to chassis or ground 10. When excited with the A.C. control voltage, the terminals A and B are of opposite polarity (180° out of phase) with respect to each other. Phase shift on the isolation transformer 42 must be negligible.

The D.C. supply source provided at the terminals 30 and 31 is energized from the driver input signal or control voltage source through a single diode rectifier circuit connected with a tap 50 on the lead 48. This comprises a series diode rectifier 51, a series filter resistor 52 and a shunt filter capacitor 54 connected to terminal 31 and ground. A supply lead 53 connected with the filter capacitor and the resistor 52 provides for the supply of rectified and filtered positive voltage to terminal 30.

From the foregoing description it will be seen that a simplified circuit is thus provided including a minimum number of relatively low cost and simple erectable components which operates to give a square-wave output signal at the terminals 8 and 9. Quadrature signals have an average D.C. component equal to zero over any half cycle and are consequently suppressed.

Consider the half cycle when the point A is positive with respect to ground and the point B is negative with respect to ground as the driver signal or control voltage is applied to the input terminals 40 and 41. The diode 36 is thus not conducting, so the current *i* passes through the diode 34, driving the base 27 of the transistor 22 positive with respect to ground. The transistor 22 then provides a low impedance circuit connecting or shunting the capacitor 15 to ground. During this and every succeeding half cycle the capacitor 15 will tend to charge to the D.C. average component of the carrier half-wave. The point B is negative so the diode 37 is in conductance driving the terminal 38 negative with the terminal B and shunting the base current *i* prime. The diode 35 is then non-conducting so that the resistor 28 in the base circuit of the transistor 23 will hold the base practically at ground potential. The transistor 23 then exhibits a very high impedance to ground allowing no change in the charge on the capacitor 16.

When the following half cycle changes the polarity of the desired carrier information and the driving signal or control voltage, the modes of the transistors 22 and 23 are reversed, producing a signal condition on the capacitor 16 equal to the capacitor 15 but of opposite polarity. The point A is now negative and the point B is positive with respect to ground. The diode 37 thus is not conducting so that the current *i*-prime passes through the diode 35 driving the base of the transistor 23 positive with respect to ground and causing it to provide a low impedance path to ground for the capacitor 16. During this and every succeeding half cycle the capacitor 16 will thus tend to charge to the D.C. average component of the carrier half wave. The diode 36 is then conducting so that terminal 38 will follow the point or terminal A in the negative direction and shunting the base current *i*. The diode 34 is nonconducting so that the resistor 28 in the base circuit of transistor 22 wil hold the base practically at ground potential. The transistor 22 then exhibits high impedance to ground and no change takes place in the charge on the capacitor 15.

The result is a square-wave output approximately equal to the average value of the carrier. This is shown by the wave shape indication between the output terminals 8 and 9, whereas the sine-wave represents typical carrier signal and control voltage wave shapes and are shown likewise in diagram form between the terminals 40 and 41 and between the terminals 6 and 7 respectively. As noted above, quadrature signals have an average D.C. component equal to zero over any given half cycle and are consequently suppressed.

The carrier signal wave shape is not critical, and may contain harmonics and higher frequency noise greater than the carrier fundamental component if properly considered for a specific application. These undesirable component will also be attenuated by the filtering characteristics of this device.

The control voltage which is applied to the drive input controls the gating devices at levels near the zero voltage crossover points of the control voltage A.C. wave. Sufficient slope amplitude is therefore provided at the zero crossover to assure immunity to noise.

I claim:

1. A signal translating circuit of the filter type for suppressing ninety degree out-of-phase signal components in an applied signal, comprising in combination, two signal conductors connected between signal input and output terminal elements, a series impedance in a first of said conductors between the input and output ends thereof, a pair of substantially equal filter capacitors connected in shunt relation between said conductors and following said impedance element along said circuit, a pair of active signal controlled gating transistor devices each having a base element and having collector-emitter paths connected one in series relation with each of said capacitors to control the flow of signal current thereto, a base bias resistor connected between each base element and the second of said conductors, and means connected with said transistor devices for applying rectified alternating-current driving signal voltage thereto at the frequency of the desired applied signal information and in predetermined phase relation thereto for alternate signal flow to and from said capacitors and a square-wave signal output in response to alternating-current signal input, said last-named means including two pairs of series-connected diodes in polarized back-to-back relation, a series supply resistor connected with each of the diode pair junctions, a driving signal voltage input coupling transformer having a center-tapped secondary connected to the second of said signal conductors at the tap and its ends coupled to the transistor base elements each through a pair of said series-connected diodes, and direct-current bias supply means connected to receive energy from said secondary winding and having a direct-current output circuit connected between each of the diode pair junctions through said series resistors and the base elements through the second of said conductors and said base bias resistors.

2. A signal filter circuit of the suppression type comprising in combination, means providing a signal-translating path therethrough and including first and second conductors having signal input and output ends with a series impedance element therebetween in the first conductor, a pair of filter capacitors connected between said conductors and directly with said first conductor on the output side of said impedance element in shunt relation across the signal translating path to receive charging current from the translated signal, a pair of electronic signal-controlled transistor gating devices each having a base element and emitter and collector electrodes, said device being connected one with each of said capacitors serially through the emitter-collector path thereof for controlling the flow of said charging current thereto, means including a pair of terminals connected with said gating devices for applying an alternating-current control voltage to the base elements with respect to the collector electrodes at the translated signal frequency in out-of-phase relation, means serially connected between said terminals and each gating device base element for applying a controlled bias current thereto and including a pair of series-connected diodes in back-to-back relation at each base element with a current supply connection to each diode junction, and means for controlling said bias current comprising a current-controlling series resistor in each of said current supply connections and a bias current supply circuit connected therefrom to the second conductor.

3. A signal filter circuit as defined in claim 2, wherein the transistors are of the NPN type with common-collector connections to the second signal conductor representing ground for the circuit with a resistor connection from said second conductor to each transistor base element as the gating control electrode, and wherein positive operating current with respect to the second conductor is applied to the diode junctions through said current-controlling series resistors by control voltage rectification in said bias current supply circuit.

References Cited

UNITED STATES PATENTS

| | | | |
|---|---|---|---|
| 2,986,652 | 5/1961 | Eachus | 307—215 |
| 3,217,184 | 11/1965 | Lach | 307—259 X |
| 3,348,157 | 10/1967 | Sullivan et al. | 328—166 X |

JOHN S. HEYMAN, *Primary Examiner.*

J. D. FREW, *Assistant Examiner.*

U.S. Cl. X.R.

329—50; 328—233, 134; 307—232, 256, 259, 295